(12) United States Patent
Beck et al.

(10) Patent No.: US 9,909,669 B2
(45) Date of Patent: Mar. 6, 2018

(54) LINEAR VALVE DRIVE AND VALVE

(71) Applicant: Buerkert Werke GmbH, Ingelfingen (DE)

(72) Inventors: Klaus Beck, Krautheim (DE); Manuel Kraft, Karlsruhe (DE); Juergen Schmidt, Bad Schoenborn (DE)

(73) Assignee: Buerkert Werke GmbH, Ingelfingen (DE)

( * ) Notice: Subject to any disclaimer, the term of this patent is extended or adjusted under 35 U.S.C. 154(b) by 57 days.

(21) Appl. No.: 15/089,631

(22) Filed: Apr. 4, 2016

(65) Prior Publication Data

US 2016/0298773 A1 Oct. 13, 2016

(30) Foreign Application Priority Data

Apr. 10, 2015 (DE) .................... 20 2015 101 759 U

(51) Int. Cl.
| | |
|---|---|
| *F16K 31/44* | (2006.01) |
| *F16K 1/32* | (2006.01) |
| *F16K 1/12* | (2006.01) |
| *F16K 31/50* | (2006.01) |
| *F16K 1/10* | (2006.01) |
| *F16K 27/02* | (2006.01) |

(52) U.S. Cl.
CPC .................. *F16K 1/32* (2013.01); *F16K 1/10* (2013.01); *F16K 1/12* (2013.01); *F16K 27/02* (2013.01); *F16K 31/50* (2013.01)

(58) Field of Classification Search
CPC ... F16K 1/32; F16K 27/02; F16K 1/10; F16K 31/50; F16K 1/12

USPC .......................................................... 251/80
See application file for complete search history.

(56) References Cited

U.S. PATENT DOCUMENTS

| | | | |
|---|---|---|---|
| 6,745,876 B2* | 6/2004 | Beck .................... | F16F 9/3292 188/266.1 |
| 2010/0252763 A1* | 10/2010 | Courth .................... | B60T 8/367 251/129.15 |
| 2012/0266832 A1* | 10/2012 | Meisel .................... | F01L 1/185 123/90.11 |

FOREIGN PATENT DOCUMENTS

EP 2222524 B1 3/2014

OTHER PUBLICATIONS

German Search Report dated Jan. 19, 2016, with Qualified English translation.

* cited by examiner

*Primary Examiner* — Umashankar Venkatesan
(74) *Attorney, Agent, or Firm* — Dilworth IP LLC

(57) ABSTRACT

A linear valve drive for connection to a valve body having a valve seat and at least one flow passage with at least one inlet and at least one outlet, comprises a drive housing with a drive unit accommodated therein, an actuating element axially shiftable by the drive unit and coupled with a valve closing element to be pressed against the valve seat, and optionally closing the flow passage, and a supporting unit surrounding the actuating element, which is designed to be attached to the valve body. A spring system loaded by actuating the linear valve drive is provided at the supporting unit, which in dependence on the compression path has different spring rates. Furthermore, a correspondingly equipped valve is described.

19 Claims, 3 Drawing Sheets

LINEAR VALVE DRIVE AND VALVE

FIELD OF THE INVENTION

This invention relates to a linear valve drive for connection to a valve body and a valve with a linear valve drive and a valve body.

BACKGROUND

Prior art valves for controlling or regulating fluids are known, which include a valve body and a linear valve drive formed separate from the valve body, to which the valve body can be connected, in order to form the valve. The linear valve drive typically includes a drive unit which can shift an axially shiftable actuating element on which a valve closing element typically is provided or integrally molded. The drive unit can move the actuating element together with the valve closing element into a closed position, in which the valve closing element rests on a valve seat formed in the valve body and seals the same, so that no fluid can flow through the valve.

One problem consists in that the tight closing force of the valve can be reduced when the linear valve drive is switched off or is switched powerless. This problem also can occur when the components of the linear valve drive expand for example due to thermal changes, which causes a drive system that was exactly matched previously to have larger tolerances, which can lead to a reduced tight closing force.

Another problem consists in that the linear valve drive or its drive unit gets jammed or blocked, when the actuating element is shifted into its closed position. This occurs in particular when the drive unit is overloaded. This can be the case, for example, when the actuating element is moved against a stop such as the valve seat or an internal stop in the drive system.

From EP 2 222 524 B1 a solenoid valve is known, which includes a setting spring for setting a pretensioning force and a regulating spring, which act against each other, in order to provide a cumulative spring force of the spring drive, with which a valve tappet of the solenoid valve is shifted. Both springs have a constant spring rate, so that the cumulative spring force also has a constant spring rate along the compression path.

It is the object of the invention to provide a linear valve drive and a valve, respectively, with a simple, reliable and inexpensive construction which prevents blocking of the linear valve drive and with which the required tight closing force can be maintained when the linear valve drive is switched off.

SUMMARY

The present invention provides a linear valve drive for connection to a valve body including a valve seat, which also has at least one flow passage with at least one inlet and at least one outlet, wherein the linear valve drive comprises a drive housing with a drive unit accommodated therein, an actuating element axially shiftable by the drive unit, which is coupled with a valve closing element to be pressed against the valve seat and optionally closing the flow passage, and a supporting unit surrounding the actuating element, which is designed to be attached to the valve seat, wherein a spring system loaded by actuating the linear valve drive is provided on the supporting unit, which in dependence on the compression path has different spring rates.

The idea underlying the invention is to provide a linear valve drive which has a spring system which due to the path-dependent spring rate can provide several safety functions at the same time. The spring system for example can comprise a blocking or overload protection and at the same time maintain a required tight closing force. Due to the changing spring stiffness of the spring system, these different functions can be provided by a single spring system. The construction of the linear valve drive thereby is compact and simple, as the one spring system includes the plurality of functions and provides the same at one common place. The maintenance of the linear valve drive thereby is facilitated in addition.

In general, the spring rate corresponds to the slope of a function in a force-path diagram. The changing spring rate or spring stiffness of the spring system in dependence on the compression path means that the function of the spring force in a force-path diagram is no straight line, but includes a curve or a discontinuity, i.e. is not linear.

The linear valve drive is equipped such that the spring system maintains the required tight closing force. Even if the linear valve drive is switched off or switched powerless or thermal changes are present, the spring system maintains the tight closing force. Occurring tolerances are compensated by the spring system.

In addition, the linear valve drive is equipped such that the spring system provides an overload protection for the linear valve drive. The overload protection comes into effect when the linear valve drive is in its closed position and would further actuate the actuating element into the closed position.

Furthermore, the linear valve drive is equipped such that the spring system provides a blocking protection for the linear valve drive. Jamming or blocking of the linear valve drive thus is prevented. This applies in particular also when the linear valve drive is detached, i.e. no valve body is connected.

Accordingly, the spring system has three safety-relevant functions at the same time for the operation of the linear valve drive.

One aspect provides that along the power flow path extending via the supporting unit from the drive unit to a coupling point of the linear valve drive a linear bearing is provided at the valve body, which allows an axial relative displacement of two portions of the linear valve drive relative to each other, wherein the spring system attempts to press two portions into a starting position in a first direction, and wherein the spring system is arranged such that it transmits axial forces in a maximally extended position of the actuating element. A compact construction of the linear valve drive thus can be ensured. The spring system acts in axial direction and can actively be compressed when an axial relative displacement occurs. Via the spring system, forces acting in axial direction thereby can be absorbed at least in part and spring forces acting in axial direction also can be released. Furthermore, the spring system also is effective when no valve body is connected and the actuating element is extended maximally, so that at least a safety function also is given in the linear valve drive without valve body connected thereto.

According to one embodiment the supporting unit is a component separate from the drive housing, wherein between the supporting unit and the drive housing the linear bearing and the spring system are arranged. The supporting unit and the drive housing thereby can axially be shifted relative to each other. The valve body can firmly be connected to the supporting unit, so that the same is axially shiftable with the supporting unit relative to the drive housing. This results in an axial relative shiftability between the drive housing and the valve body, in case the same is connected to the linear valve drive.

Another aspect provides that the supporting unit is a tube enclosing the actuating element, which extends into an opening in an end wall of the drive housing, in order to be mounted therein, in particular wherein at the housing-side end of the tube the spring system engages, which is supported on the inside of the housing. The spring system thus is arranged directly at the interface between the supporting unit and the drive housing, whereby an axial relative displacement of the supporting unit with respect to the drive housing is possible via the spring system. Furthermore, it thereby is ensured that the supporting unit is at least partly captively mounted in the drive housing. The supporting unit can be formed rotationally symmetrical, for example, due to the fact that the tube has a circular cylindrical cross-section.

According to a further embodiment the supporting unit has at least two portions axially movable relative to each other and connected via the linear bearing, between which the spring system acts. According to this embodiment, the axial relative displacement is provided between the two portions of the supporting unit. In this embodiment it is possible in particular that the portion of the supporting unit associated to the drive housing is firmly connected with the drive housing, whereas the valve body is connectable to the other portion.

In particular, the two portions axially movable relative to each other can telescopically be pushed into each other. In this way a linear valve drive can be provided, which has a large maximum adjustment path and yet has a compact construction.

The spring system can comprise at least one first spring subsystem and one second spring subsystem, which have different spring rates. A particularly simple spring system thus is created, which has at least two different spring rates. The spring system thus can have two functions at a single place. Furthermore, one of the two spring subsystems can easily be exchanged or be replaced by another system, in order to subsequently vary the characteristic of the spring system. The maintenance thereby is simplified as well.

In particular, the spring subsystems can be connected in series. This results in a particularly simple and compact construction of the spring system. Furthermore, the spring rate of the spring system easily can be formed dependent on the compression path, as initially the spring subsystem with the smaller spring rate is active chiefly or almost exclusively.

The spring system can be constructed by several spring subsystems. The spring subsystems, in particular in a starting position, preferably directly rest against each other, i.e. without interposed elements of a stiffer material.

According to a further aspect, the first spring subsystem is a closing system which with a non-activated drive unit urges the actuating element in direction of the closed position, and the second spring subsystem is an overload protection which is compressed when the linear valve drive not coupled with a valve body moves the actuating element maximally to the outside and against an internal stop. The two spring subsystems thus each cover a different function of the spring system. The spring subsystems are arranged such that initially almost only the first spring subsystem chiefly is active with a first, shorter compression path and exerts an additional force on the valve closing element. The second spring subsystem on the other hand only is noticeably compressed when a predetermined adjustment path is exceeded. The second spring subsystem in particular serves to absorb forces which proceed from the drive unit. Due to the design of the second spring subsystem it is ensured in addition that the same also is active when no valve body is connected to the linear valve drive. The overload protection function thus already is fully operational in the separately formed linear valve drive.

In particular, the second spring subsystem has a higher spring rate than the first spring subsystem. This is connected with the different functions covered by the two spring subsystems. The second spring subsystem protects the linear valve drive, in particular the drive unit accommodated therein, from a mechanical overload, which is why it has a higher spring rate. On the other hand, the first spring subsystem maintains an additional tight closing force, when the valve closing element is in a closed position and the drive unit is switched off. Due to the lower spring rate of the first spring subsystem, the drive unit hardly is loaded when the actuating element is shifted against the spring force of the first spring subsystem.

Another aspect provides that the second spring subsystem has a spring rate between 400 N/mm and 16000 N/mm, in particular at about 500 N/mm, and/or the first spring subsystem has a spring rate between 0.1 N/mm and 600 N/mm, in particular at about 200 N/mm. These are typical spring rates which are suitable to ensure the different functions of the spring subsystems. In particular, the chosen spring rates depend on the size of the linear valve drive and the strength of the drive unit.

The first and/or the second spring subsystem can be formed of several spring elements which in particular are connected in series. Via the number of spring elements the spring rate can be set correspondingly. Furthermore, a spring subsystem with a higher spring rate thus can be provided in a simple way. A subsequent modification or adaptation of the spring rate of a spring subsystem or of both spring subsystems likewise is possible in that a spring element is exchanged or an additional one is added. The spring subsystems generally can be formed as spring packs.

According to an exemplary embodiment, the first spring subsystem and the second spring subsystem each can be formed of at least one disk spring surrounding the actuating element, wherein the disk springs of the spring subsystems are stacked on top of each other. A rotationally symmetrical and compact construction of the spring system thereby is created, as the two spring subsystems are directly stacked on top of each other. Furthermore, the power transmission thereby is optimized, as a homogeneously distributed power transmission exists.

Another aspect provides that at least one spring travel limiter present between the spring elements is provided, which limits the spring travel of the spring system. The spring travel limiter ensures that the spring system only is provided with a limited spring travel. The spring travel limiter therefor preferably is arranged in the first spring subsystem, so that from a particular spring travel of the entire spring system the spring travel of the first spring subsystem is limited by the spring travel limiter. The consequence is that from this particular spring travel onwards only the second spring subsystem is active and protects the linear valve drive from an overload. The spring travel limiter arranged in the first spring subsystem thus ensures a targeted transition from the first to the second spring subsystem.

In particular, the actuating element can be a valve tappet at whose end the valve closing element is provided. A valve drive thereby can be formed, in which the actuating element and the valve closing element in particular are formed in one part.

One aspect provides that the linear bearing additionally forms a pivot bearing which rotatably supports two portions of the linear valve drive relative to each other, preferably by more than 360°. This function among other things is made possible by the spring system, as the spring system is formed rotationally symmetrical. The linear valve drive thereby can be used in various positions, whereby a higher flexibility is present for example for aligning the ports of the valve drive.

The object of the invention furthermore is solved by a valve with a valve body and a linear valve drive as described above, wherein the valve body includes at least one inlet, at least one outlet, at least one flow passage and at least one valve seat. The aforementioned advantages of the linear valve drive analogously can be transferred to the valve.

According to one embodiment the supporting unit is attached to the valve body, wherein the linear bearing and the spring system are provided between the supporting unit and the valve body. The valve formed in this way is characterized in that the axial shiftability is provided between the valve body and the entire linear valve drive, in particular between the valve body and the supporting unit, which is part of the linear valve drive. The linear valve drive as such can be formed in one part, so that no axial relative displacement of the components is possible.

According to a further aspect the spring system is formed such that the linear valve drive is rotatable relative to the valve body about the longitudinal axis, preferably by more than 360°, i.e. in particular endlessly, wherein in particular the linear bearing also forms a pivot bearing. The relative rotatability of the linear valve drive, in particular of the drive housing, with respect to the valve body likewise is given with connected valve body. The entire linear valve drive accordingly can be rotated relative to the valve body.

DETAILED DESCRIPTION

Figure 1:
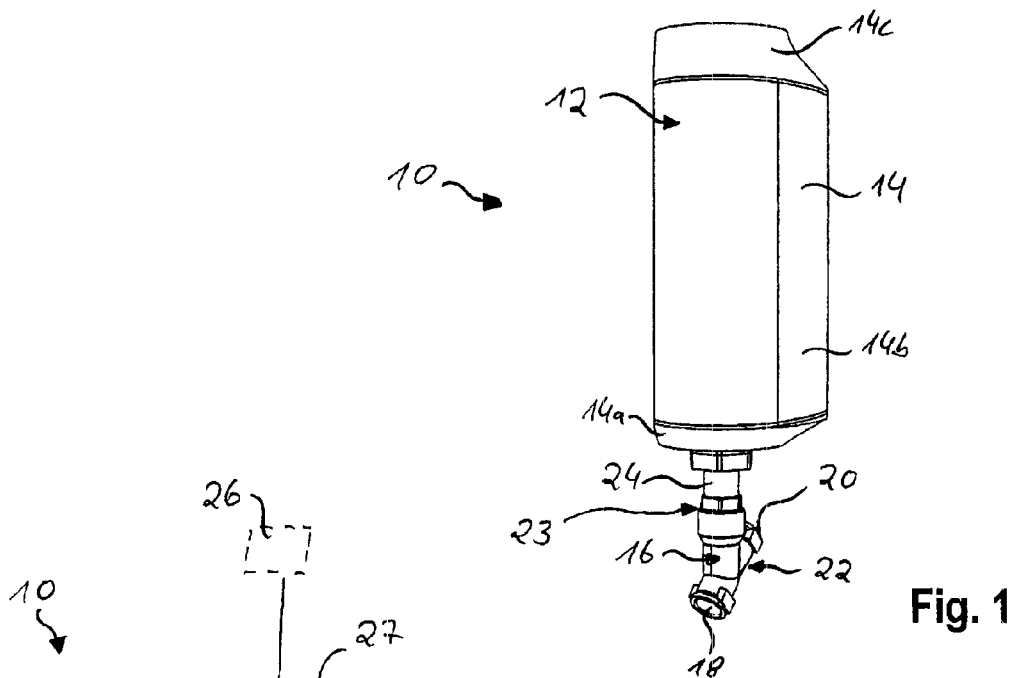
FIG. 1 shows a perspective view of a valve according to the invention.

FIG. 1 shows a valve 10 which comprises a linear valve drive 12 with a drive housing 14 and a valve body 16.

The valve body 16 includes an inlet 18 and an outlet 20. Between the inlet 18 and the outlet 20 a flow passage 22 is formed, through which a fluid can flow whose flow rate can be set, in particular be regulated or controlled, by the valve 10.

The valve body 16 is connected to the separately formed linear valve drive 12 via a coupling point 23 which is provided on a supporting unit 24 of the linear valve drive 12. In the embodiment shown, the supporting unit 24 is formed separate from the drive housing 14 and separate from the valve body 16, as can be taken for example from FIG. 2 in which the valve 10 is shown in a sectional representation in the region of the supporting unit 24.

Figure 2:
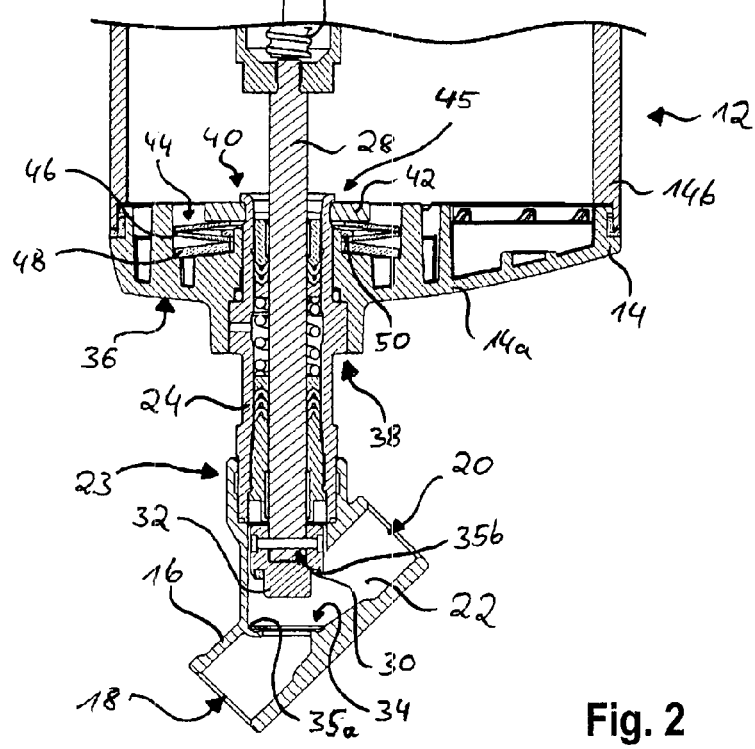
FIG. 2 shows a sectional view of the valve according to the invention from FIG. 1 in the region of the supporting unit.

FIG. 2 shows that the linear valve drive 12 includes a drive unit 26 which in FIG. 2 is represented in broken lines. An axially shiftable actuating element 28 is coupled with the drive unit 26 and can be driven and hence shifted by the drive unit 26. The drive unit 26 can be a pneumatically, hydraulically or electrically actuatable drive unit. Alternatively, the drive unit 26 also can be a drive unit to be actuated manually.

The drive unit 26 or generally the linear valve drive 12 can include a step-up gear unit 27 which in the illustrated embodiment is formed as spindle-nut assembly which converts a rotatory movement of an electric motor into a linear movement of the actuating element 28.

In the embodiment shown, the actuating element 28 is formed as valve spindle which extends from the step-up gear unit 27 through the tubular supporting unit 24 into the valve body 16. The supporting unit 24 therefore can also be referred to as spindle tube. The actuating element 28 has an axial end 30 which is associated to the valve body 16. At this axial end 30 a valve closing element 32 is arranged on the actuating element 28 which can be formed separate from the same.

The valve closing element 32 can cooperate with a valve seat 34 formed in the valve body 16, in order to close the valve 10. For this purpose, the actuating element 28 is shifted into its closed position by the drive unit 26, so that the valve closing element 32 sealingly rests on the valve seat 34. Then, the fluid no longer can flow through the flow passage 22, as the same is blocked.

At the valve seat 34 a seal 35a can be provided, which cooperates with the valve closing element 32, in order to improve the sealing effect when the valve closing element 32 rests on the valve seat 34. Alternatively or in addition a seal 35b can be provided at the valve closing element 32.

In general, the valve closing element 32 serves to vary the cross-section through the flow passage 22, whereby a flow rate of the fluid can be set. The valve closing element 32 thus can take various intermediate positions between the open position (FIG. 3) and the closed position (FIG. 4).

The actuating element 28 in particular can be formed as valve tappet at whose end the valve closing element 32 is formed in one part.

Furthermore, FIG. 2 reveals that the drive housing 14 consists of several parts, as it comprises an end-face lid element 14a with an end wall 36 as well as a shell-shaped housing part 14b which is coupled with the lid element 14a. Furthermore, the housing 14 includes a housing lid 14c opposite the lid element 14a (see FIG. 1), which likewise is coupled with the shell-shaped housing part 14b.

The drive housing 14, in particular the lid element 14a, has an opening 38 in the region of the end wall 36, into which the supporting unit 24 is inserted. The supporting unit 24 partly extends through the opening 38 into the drive housing 14 and is axially shiftably guided there. The axial end 40 of the supporting unit 24, which protrudes into the drive housing 14, is shaped like a collar, wherein the end 40 for example can be manufactured or subsequently be formed, in particular be bent as such.

Against the formed end 40 of the supporting unit 24 a disk- or ring-shaped supporting element 42 rests, on which a spring system 44 furthermore is supported. The supporting element 42 serves for the improved contact of the spring system 44 and for pretensioning the spring system 44, as will yet be explained below.

In general, the spring system 44 is provided in the power flow path between the drive unit 26 and the coupling point 23 of the linear valve drive 12 at the valve body 16, whereby among other things the axial relative displacement between two portions of the linear valve drive 12 is possible. The drive unit 26 is firmly coupled with the drive housing 14, in particular with the housing lid 14c or the shell-shaped housing part 14b.

In the embodiment shown, the spring system 44 is arranged such that with its first end it supports on the supporting unit 24 formed separate from the drive housing 14 via the supporting element 42 and with its second end it supports on an inside of the drive housing 14, in particular on the inside of the lid element 14a. The spring system 44 thereby resiliently lies in the axial power flow path between the valve body 16 and the drive housing 14, so that axial compressive forces can be transmitted. Due to the arrangement of the spring system 44 between the drive housing 14 and the supporting unit 24, the drive housing 14 can shift in axial direction relative to the supporting unit 24 and the valve body 16 firmly connected thereto.

In the region of the spring system 44 a linear bearing 45 accordingly is formed, which provides for the axial relative displacement of the supporting unit 24 with respect to the drive housing 14.

In the embodiment shown, the spring system 44 comprises a first spring subsystem 46 and a second spring subsystem 48, which are arranged in series and are arranged directly on top of each other. The two spring subsystems 46, 48 in addition have a different spring rate, as can be taken from FIG. 5, to which reference will be made later. Due to the different spring rates of the spring subsystems 46, 48 arranged in series, the entire spring system 44 has a spring-travel-dependent spring rate or a spring rate dependent on the compression path of the spring system 44.

Alternatively, the spring system 44 also can include more than two spring subsystems, whereby a correspondingly finer adjustment of the travel-dependent spring rate of the spring system 44 is possible.

In a further alternative aspect, the spring system 44 can be formed by a single spring which for example has several steps, whereby the travel-dependent spring rate is realized.

In the embodiment shown, the two spring subsystems 46, 48 each are formed of disk springs which are stacked on top of each other and surround the actuating element 28. The disk springs accordingly are formed substantially disk- or ring-shaped and in a homogeneous way act on the drive housing 14 as well as the supporting element 42.

For example due to the rotationally symmetrical design of the spring system 44 the linear bearing 45 at the same time can form a pivot bearing, whereby the portions of the linear valve drive 12 axially shiftable relative to each other also are rotatably mounted relative to each other. This means that in the embodiment shown the drive housing 14 and the supporting unit 24 with the valve body 16 connected thereto can be rotated relative to each other by more than 360°. As a result, the linear valve drive 12 and the valve 10 can be used in various installation positions.

In the embodiment shown, the first spring subsystem 46 is formed by two spring elements which are connected in series and thus form a spring pack. The second spring subsystem 48 on the other hand merely includes a single spring element. The second spring subsystem 48 like the first spring subsystem 46 can be formed by several spring elements or the first spring subsystem 46 like the second spring subsystem 48 merely by one spring element.

In general, instead of or in addition to the illustrated disk springs coil springs, leaf springs, elastomer springs or torsion springs can be used, which can also be combined with each other, in order to achieve the desired spring rates and properties.

FIG. 2 furthermore reveals that a spring travel limiter 50 is provided in the spring system 44. In the embodiment shown, the spring travel limiter 50 is a ring arranged between the two spring elements of the first spring subsystem 46 and thereby limits the spring travel of the first spring subsystem 46, as will yet be explained below.

Alternatively or in addition a spring travel limiter also can be provided in the second spring subsystem 48.

Figure 3:
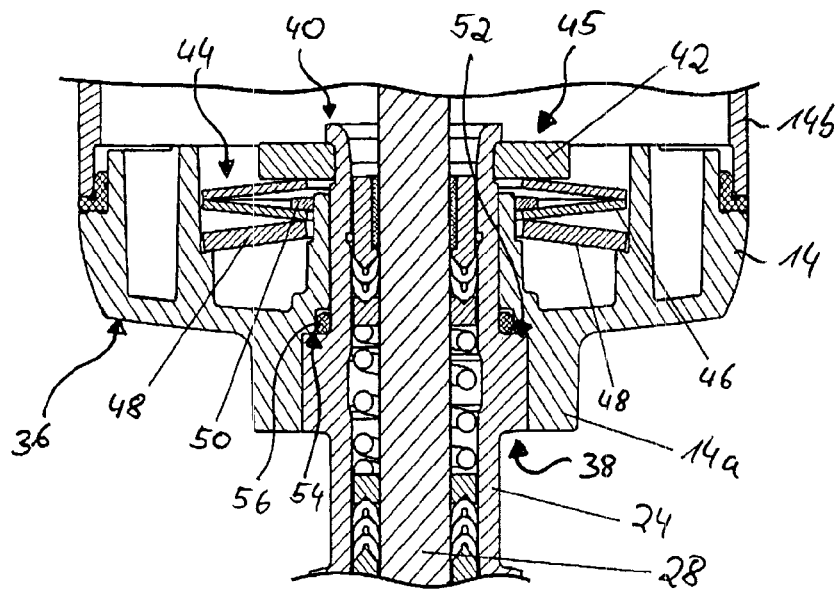
FIG. 3 shows a view of the valve shown in FIG. 2 in an open position, wherein the sectional plane is chosen slightly different from the one in FIG. 2.
Figure 4:
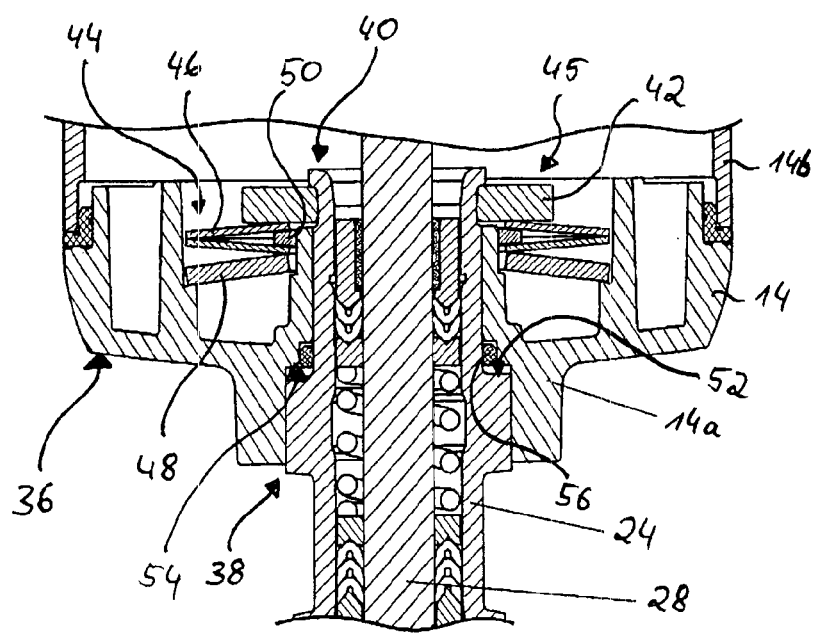
FIG. 4 shows the detail view of the valve shown in FIG. 2 in a closed position.

FIG. 3 shows that the valve 10 is in its open position. In this position the drive unit 26 has completely retracted the actuating element 28, so that the valve closing element 32 is not in contact with the valve seat 34. The free flow cross-section in the flow passage 22 is at a maximum in the illustrated open position.

In the open position, the supporting unit 24 rests against a stop 54 which is formed at the housing 14 via a stop surface 52. At the stop 54 there is also provided a seal 56 which is formed ring-shaped. The stop 54 thus limits the axial relative movement of the supporting unit 24 to the housing 14.

A comparison of FIGS. 2 and 3 shows that in the position shown in FIG. 2 the actuating element 28 and the valve closing element 32 arranged thereon already have almost been in the open position. This can be recognized particularly well by the position of the supporting element 42.

FIG. 4 shows the same section as it is shown in FIG. 3, but the actuating element 28 as well as the valve closing element 32 arranged thereon have been shifted into the closed position by the drive unit 26.

In this position the counterforce to the axial closing force is transmitted to the drive housing 14, to which the drive unit 26 is attached, via the supporting unit 24, the supporting element 42 resting against the same and the spring system 44 supporting on the supporting element 42. Correspondingly, the spring system 44 is located in the axial power flow path.

Furthermore, in the closed position the supporting unit 24 no longer rests against the stop 54 via its stop surface 52, so that a gap is formed between the housing 14 and the supporting unit 24 in the region of the stop 54.

With respect to FIG. 5, in which the spring characteristic of the spring system 44 is shown in a normalized representation, the mode of operation of the spring system 44 will be explained.

In the open position shown in FIG. 3, the linear valve drive 12 is in its starting position in which the actuating element 28 is retracted completely. In this position, the spring system 44 can be pretensioned depending on the design and arrangement of the supporting element 42. This starting position corresponds to an adjustment path of +10 in the diagram shown in FIG. 5.

Figure 5:
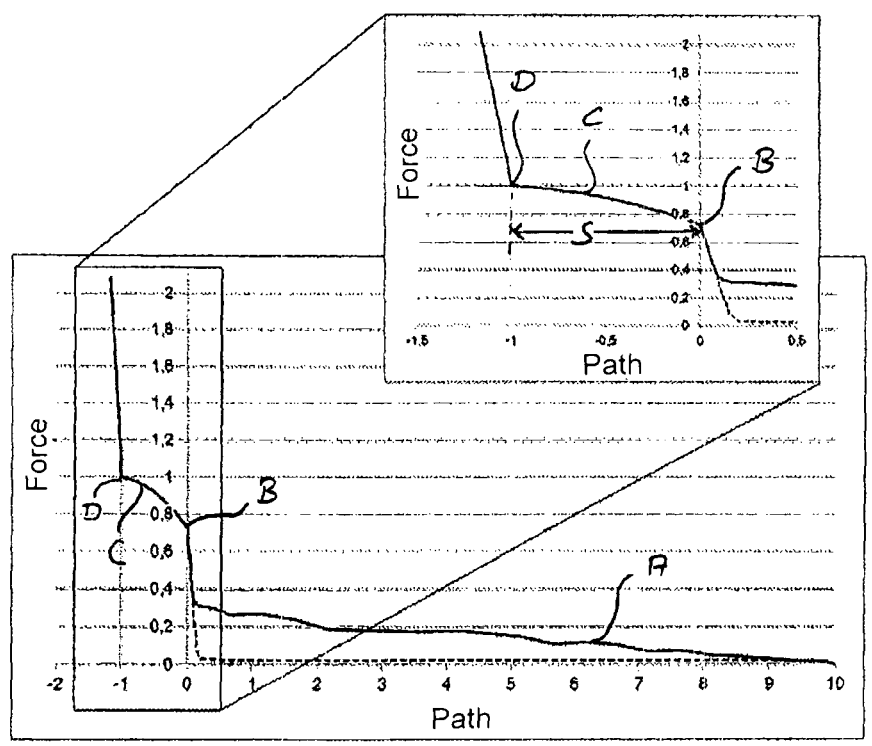
FIG. 5 shows a spring characteristic of the spring system used.

When the actuating element 28 is transferred from the open position shown in FIG. 3 into the closed position shown in FIG. 4 by means of the valve closing element 32, a force must be applied in the region of the path from +10 to 0 against the force A as shown in FIG. 5.

As soon as the valve closing element 32 reaches the valve seat 34, which corresponds to the adjustment path at 0, the force required to further shift the actuating element 28 increases. The minimum tight closing force B existing at this position is at least 100% of the force acting on the valve closing element 32 through the fluid. This guarantees that the valve closing element 32 cannot be shifted and opened due to the fluid force acting on the valve closing element 32. Preferably, the minimum tight closing force B is at least 105% of the fluid force.

From this position, the drive unit 26 shifts the actuating element 28 further axially in direction of the valve seat 34, so that the seal 35a and/or 35b provided between the valve closing element 32 and the valve seat 34 is/are compressed more strongly.

When the actuating element 28 at 0 is shifted further axially along the adjustment path, the first spring subsystem 46 chiefly, i.e. almost only is compressed, wherein the linear valve drive 12 must exert a correspondingly higher force acting against the tight closing force C along a path S, as can be taken from the diagram in FIG. 5.

The further the actuating element 28 is shifted along the adjustment path S, the more strongly is the first spring subsystem 46 compressed. At the same time, the drive housing 14 moves in axial direction relative to the supporting unit 24. This can be clearly recognized when FIGS. 3 and 4 are compared in the region of the opening 38 in the end wall 36 or the position of the supporting elements 42 is compared.

The first spring subsystem 46 is formed such that the tight closing spring force C is as constant as possible along the path S. In practice, however, minimum deviations from this theoretical ideal case are obtained. The spring force of the first spring subsystem 46 is chosen such that a tight closing spring force C is obtained, which is high enough to maintain the sealing function and at the same time is not too high, so that the drive unit 26 and the seal are not loaded unnecessarily when it shifts the actuating element 28 against the tight closing spring force C.

The path S typically is chosen so long that all possible changes in length due to thermal influences, the setting of the seals 35a, 35b, and a possible clearance in the linear valve drive 12 are taken into account, in order to ensure that the same can be compensated. Usually, the path S approximately is 2% to 15% of the entire adjustment path of the valve 10, in particular between 5% and 10%. The path S or the adjustment path along the path S guarantees that the required tight closing force can be applied durably, even if the drive unit 26 is switched off.

In normal operation, the drive unit 26 is switched off at approximately half of the path S, so that the valve closing element 32 remains in this position and a sufficient tight closing force is guaranteed via the first spring subsystem 46. This position of the valve closing element 32 furthermore can be maintained due to self-locking of the components of the linear valve drive 12.

Should the drive unit 26 shift the actuating element 28 with the valve closing element 32 further than to the point provided in normal operation, the first spring subsystem 46 can be compressed maximally or the spring travel limiter 50 provided in the first spring subsystem 46 is used. This is shown in FIG. 4 and in the diagram of FIG. 5.

From point D (see FIG. 5) the force no longer is transmitted via the first spring subsystem 46, as the two spring elements of the first spring subsystem 46 contact the interposed spring travel limiter 50. The first spring subsystem 46 thus no longer is compressible, which leads to the fact that the second spring subsystem 48 chiefly becomes active. The second spring subsystem 48 accordingly is compressed only when a certain spring travel of the spring system 44 or adjustment path of the actuating element 28 is reached. Via the spring travel limiter 50 a targeted transition can be set, from which the second spring subsystem 48 is compressed.

As mentioned already, the two spring subsystems 46, 48 have different spring rates, whereby the spring system 44 has a spring-travel-dependent spring rate. This is also illustrated in FIG. 5.

The second spring subsystem 48 has a distinctly higher spring characteristic than the first spring subsystem 46. For example, the second spring subsystem 48 can have a spring rate between 400 N/mm and 16000 N/mm, in particular the spring rate of the second spring subsystem 48 is about 500 N/mm. On the other hand, the first spring subsystem 46 can have a spring rate between 0.1 N/mm and 600 N/mm. In particular, the spring rate of the first spring subsystem 46 is about 200 N/mm.

Due to the higher spring rate of the second spring subsystem 48 it is ensured that the drive unit 26 is protected from a mechanical overload. This safety function is important in particular during fast shifting of the valve 10 into its closed position. Due to the second spring subsystem 48, the drive unit 26 must work against its higher spring rate and does not hit a stop directly, like the valve seat 34 or an internal stop. When hitting the stop unbraked, the drive unit 26 otherwise might get jammed or blocked mechanically.

The first spring subsystem 46 on the other hand merely represents a closing system which with non-activated drive unit 26 urges the actuating element 28 and the closing element 32 arranged thereon in direction of the closed position, so that the valve 10 remains in its closed position, even if the drive unit 26 is switched off.

Due to the spring-travel-dependent spring rate, the spring system 44 accordingly provides a uniform spring system which includes two functions, namely the overload protection and the maintenance of the required tight closing force. Furthermore, a rotatability of the drive housing 14 with respect to the valve body 16 or the supporting unit 24 is achieved via the spring system 44, as has been mentioned already. The spring system 44 illustrated in the embodiment thus even has three functions.

The spring system 44 also is effective when no valve body 16 is connected to the linear valve drive 12. The actuating element 28 then would be shifted downwards, until a stop surface of the nut of the nut-spindle assembly 27 gets in contact with the end 40 of the supporting unit 24 (see FIG. 2). The spring system 44 would then be activated in a way analogous to FIG. 4 and effectively prevent blocking of the drive unit 26.

Furthermore, there can be provided a controller which records the current consumption of the linear valve drive 12, in particular of the drive unit 26. Due to the different spring characteristics of the two subsystems 46, 48 a different current consumption is obtained. By means of the recorded and subsequently evaluated data an optimization of the operation of the linear valve drive 12 can be performed.

In a further embodiment not illustrated here the supporting unit 24 can be formed in two parts, wherein the spring system 44 is arranged between two portions of the supporting unit 24. The linear bearing then is effected between the two portions of the supporting unit 24, so that the two portions are axially movable relative to each other. The portion of the supporting unit 24, which is associated to the drive housing 14, can integrally be connected with the drive housing 14.

Advantageously, the two portions of the supporting unit 24 can telescopically be pushed into each other, so that a compact construction and yet large adjustment path of the linear valve drive 12 is possible.

In another embodiment not illustrated here the spring system 44 is provided in the region of the coupling point 23 of the linear valve drive 12 at the valve body 16, so that the linear bearing also is present there. In this embodiment, the supporting unit 24 can be formed in one part with the drive housing 14, in particular with the lid element 14*a*.

The supporting unit 24 and its portions, the spring system 44 as well as the coupling point 23 in particular can be formed such that the corresponding linear bearing at the same time forms a pivot bearing.

According to the invention a linear valve drive 12 and a valve 10 thus is created, which has a compact construction in which a spring system 44 is provided, which combines several functions at one place.

The invention claimed is:

1. A linear valve drive for connection to a valve body, which valve body includes a valve seat and had has at least one flow passage with at least one inlet and at least one outlet, wherein the linear valve drive comprises a drive housing with a drive unit accommodated therein, an actuating element axially shiftable by the drive unit, which is coupled with a valve closing element to be pressed against the valve seat to open or close the flow passage, and a supporting unit surrounding the actuating element designed to be attached to the valve body, wherein a spring system loaded by actuating the linear valve drive is provided on the supporting unit, which spring system in dependence on the compression path has different spring rates, wherein the spring system comprises overload protection and comprises two or more spring subsystems, wherein the spring subsystems are aligned to be compressible by forces from the same axial direction, and at least two spring subsystems have different spring rates.

2. The linear valve drive according to claim 1, wherein a linear bearing is provided at the valve body along a power flow path extending via the supporting unit from the drive unit to a coupling point of the linear valve drive, the linear bearing allowing an axial relative displacement of two portions of the linear valve drive relative to each other, wherein the spring system attempts to press the two portions into a starting position in a first direction, and wherein the spring system is arranged such that it transmits axial forces in a maximally extended position of the actuating element.

3. The linear valve drive according to claim 1, wherein the supporting unit is a component separate from the drive housing, wherein a linear bearing and the spring system are arranged between the supporting unit and the drive housing.

4. The linear valve drive according to claim 3, wherein the supporting unit is a tube enclosing the actuating element, wherein a housing-side end of the tube extends into an opening in an end wall of the drive housing, in order to be mounted therein.

5. The linear valve drive according to claim 4, wherein the spring system engages at the housing-side end of the tube, the housing-side end being supported on the inside of the housing.

6. The linear valve drive according to claim 2, wherein the supporting unit has at least two portions axially movable relative to each other and connected via the linear bearing, between which the spring system acts.

7. The linear valve drive according to claim 6, wherein the two portions axially movable relative to each other are telescopically pushed into each other.

8. The linear valve drive according to claim 1, wherein the spring system comprises at least one first spring subsystem and one second spring subsystem, the spring subsystems having different spring rates wherein the first and second spring subsystems are connected in series.

9. The linear valve drive according to claim 8, wherein the first spring subsystem is a closing system, which with a non-activated drive unit urges the actuating element in direction of the closed position, and the second spring subsystem is an overload protection which is compressed when the linear valve drive not coupled with a valve body moves the actuating element maximally outside and against an internal stop.

10. The linear valve drive according to claim 8, wherein the second spring subsystem has a higher spring rate than the first spring subsystem.

11. The linear valve drive according to claim 8, wherein the second spring subsystem has a spring rate between 400 N/mm and 16000 N/mm and/or the first spring subsystem has a spring rate between 0.1 N/mm and 600 N/mm.

12. The linear valve drive according to claim 8, wherein the first and/or the second spring subsystem is/are formed of several spring elements.

13. The linear valve drive according to claim 12, wherein the several spring elements are connected in series.

14. The linear valve drive according to claim 8, wherein the first spring subsystem and the second spring subsystem each are formed of at least one disk spring surrounding the actuating element, wherein the disk springs of the spring subsystems are stacked on top of each other.

15. The linear valve drive according to claim 1, wherein at least one spring travel limiter present in the spring system is provided, which limits the spring travel of the spring system.

16. The linear valve drive according to claim 1, wherein the actuating element is a valve tappet at whose end the valve closing element is provided.

17. The linear valve drive according to claim 2, wherein the linear bearing additionally forms a pivot bearing which rotatably supports two portions of the linear valve drive relative to each other.

18. A valve with a valve body which includes at least one inlet, at least one outlet, at least one flow passage and at least one valve seat, as well as a linear valve drive for connection to said valve body, wherein the linear valve drive comprises a drive housing with a drive unit accommodated therein, an actuating element axially shiftable by the drive unit, which is coupled with a valve closing element to be pressed against the valve seat to open or close the flow passage, and a supporting unit surrounding the actuating element designed to be attached to the valve body, wherein a spring system loaded by actuating the linear valve drive is provided on the supporting unit, which spring system in dependence on the compression path has different spring rates, wherein the spring system comprises overload protection and comprises two or more spring subsystems, wherein the spring subsystems are aligned to be compressible by forces from the same axial direction, and at least two spring subsystems have different spring rates.

19. The valve according to claim 18, wherein the supporting unit is attached to the valve body, wherein a linear bearing and the spring system are provided between the supporting unit and the valve body.

* * * * *